(12) United States Patent
Feldman

(10) Patent No.: US 10,199,066 B1
(45) Date of Patent: Feb. 5, 2019

(54) WRITE MANAGEMENT OF PHYSICALLY COUPLED STORAGE AREAS

(71) Applicant: Seagate Technology LLC, Cupertino, CA (US)

(72) Inventor: Timothy R. Feldman, Louisville, CO (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/971,119

(22) Filed: May 4, 2018

Related U.S. Application Data

(60) Provisional application No. 62/637,234, filed on Mar. 1, 2018.

(51) Int. Cl.
| | |
|---|---|
| *G11B 20/12* | (2006.01) |
| *G11B 5/596* | (2006.01) |
| *G11B 5/09* | (2006.01) |
| *G11B 5/012* | (2006.01) |

(52) U.S. Cl.
CPC .......... *G11B 20/1258* (2013.01); *G11B 5/012* (2013.01); *G11B 5/09* (2013.01); *G11B 5/59633* (2013.01)

(58) Field of Classification Search
CPC .................. G11B 5/09; G11B 20/1217; G11B 2020/1238; G11B 2020/1242; G11B 2020/1292; G11B 5/012; G11B 2020/1267; G11B 2020/1298; G06F 12/0238; G06F 3/061; G06F 12/10; G06F 3/065; G06F 3/0689; G06F 3/0658; G06F 2212/1016; G06F 3/0611; G06F 3/0646; G06F 3/0653; G06F 3/0676

USPC .......................................................... 360/48
See application file for complete search history.

(56) References Cited

U.S. PATENT DOCUMENTS

| | | | |
|---|---|---|---|
| 4,030,130 A | 6/1977 | Smith | |
| 4,152,736 A | 5/1979 | Jansen et al. | |
| 4,298,897 A | 11/1981 | Arter et al. | |
| 4,535,372 A | 8/1985 | Yeakley | |
| 4,622,601 A | 11/1986 | Isozaki et al. | |
| 4,646,168 A | 2/1987 | Sonobe et al. | |
| 4,771,346 A | 9/1988 | Shoji et al. | |

(Continued)

FOREIGN PATENT DOCUMENTS

| | | | |
|---|---|---|---|
| EP | 484774 A2 | 5/1992 | |
| EP | 1564736 A2 | 8/2005 | |

(Continued)

*Primary Examiner* — Nabil Z Hindi
(74) *Attorney, Agent, or Firm* — Holzer Patel Drennan

(57) ABSTRACT

A method for managing data bands within an interlaced magnetic recording (IMR) architecture includes transmitting read/write characteristics of a logical block address space, the read/write characteristics including coupling information characterizing a physical arrangement of data blocks associated with different logical zones in the logical block address space, where each of the logical zones spans a continuous range of logical block addresses mapped to a series of data blocks physically interlaced with another series of data blocks corresponding to another one of the logical zones. The method further provides for executing a write command instructing a data write to a target logical zone of the logical zones, the write command being generated based on the transmitted coupling information.

20 Claims, 6 Drawing Sheets

(56) References Cited

U.S. PATENT DOCUMENTS

| | | |
|---|---|---|
| 4,803,571 A | 2/1989 | Fujioka et al. |
| 4,853,799 A | 8/1989 | Aikawa |
| 5,010,430 A | 4/1991 | Yamada et al. |
| 5,285,341 A | 2/1994 | Suzuki et al. |
| 5,402,270 A | 3/1995 | McDonnell et al. |
| 5,760,993 A | 6/1998 | Purkett |
| 5,892,634 A | 4/1999 | Ito et al. |
| 5,978,168 A | 11/1999 | Mathews et al. |
| 6,052,797 A | 4/2000 | Ofek et al. |
| 6,104,562 A | 8/2000 | Ottesen et al. |
| 6,185,063 B1 | 2/2001 | Cameron |
| 6,412,042 B1 | 6/2002 | Paterson et al. |
| 6,710,960 B1 | 3/2004 | Yorimitsu |
| 6,768,605 B2 | 7/2004 | Yamamoto |
| 7,130,152 B1 | 10/2006 | Raymond et al. |
| 7,259,927 B2 | 8/2007 | Harris |
| 7,393,066 B2 | 7/2008 | Dugas et al. |
| 7,440,222 B2 | 10/2008 | Nakamura et al. |
| 7,508,619 B2 | 3/2009 | Okamoto et al. |
| 7,573,682 B2 | 8/2009 | Pust et al. |
| 7,872,829 B2 | 1/2011 | Sakai |
| 7,907,360 B2 | 3/2011 | Mak et al. |
| 7,957,093 B2 | 6/2011 | Brand |
| 7,965,465 B2 | 6/2011 | Sanvido et al. |
| 8,023,215 B1 | 9/2011 | Ghaly et al. |
| 8,139,318 B2 | 3/2012 | Biskeborn |
| 8,310,777 B2 | 11/2012 | Biskeborn et al. |
| 8,310,782 B2 | 11/2012 | Song et al. |
| 8,531,792 B1 | 9/2013 | Burd et al. |
| 8,531,793 B2 | 9/2013 | Bandic et al. |
| 8,537,481 B1 | 9/2013 | Bandic |
| 8,599,510 B1 | 12/2013 | Fallone |
| 8,693,123 B1 | 4/2014 | Guo et al. |
| 8,699,159 B1 | 4/2014 | Malina |
| 8,699,162 B1 | 4/2014 | Grobis et al. |
| 8,711,517 B2 | 4/2014 | Erden et al. |
| 8,854,752 B2 | 10/2014 | Jin et al. |
| 8,867,161 B2 | 10/2014 | Emo et al. |
| 8,873,178 B2 | 10/2014 | Erden et al. |
| 8,913,335 B2 | 12/2014 | Coker et al. |
| 8,917,469 B1 | 12/2014 | Guo et al. |
| 8,929,186 B1 | 1/2015 | Sharma et al. |
| 8,976,478 B1 | 3/2015 | Harllee, III et al. |
| 9,053,712 B1 | 6/2015 | Guo et al. |
| 9,058,829 B1 | 6/2015 | Wolf et al. |
| 9,082,458 B1 | 7/2015 | Tang |
| 9,087,541 B1 | 7/2015 | Pokharel et al. |
| 9,099,103 B1 | 8/2015 | Krichevsky |
| 9,105,302 B1 | 8/2015 | Erden et al. |
| 9,111,575 B1 | 8/2015 | Zhou et al. |
| 9,111,578 B1 | 8/2015 | Hassel et al. |
| 9,129,658 B1 | 9/2015 | Yamamoto |
| 9,142,232 B2 | 9/2015 | Edelman et al. |
| 9,142,246 B1 | 9/2015 | Trantham et al. |
| 9,153,287 B1 | 10/2015 | Hamilton et al. |
| 9,324,362 B1 | 4/2016 | Gao |
| 9,396,062 B1 | 7/2016 | Sridhara et al. |
| 9,418,688 B1 | 8/2016 | Rausch et al. |
| 9,508,362 B2 | 11/2016 | Gao et al. |
| 9,747,942 B2 * | 8/2017 | Gao .................. G11B 20/1217 |
| 2002/0035666 A1 | 3/2002 | Beardsley et al. |
| 2002/0035704 A1 | 3/2002 | Wilson |
| 2002/0105867 A1 | 8/2002 | Tamaru et al. |
| 2003/0214886 A1 | 11/2003 | Sakamoto et al. |
| 2005/0078399 A1 | 4/2005 | Fung et al. |
| 2005/0157597 A1 | 7/2005 | Sendur et al. |
| 2006/0215511 A1 | 9/2006 | Shin et al. |
| 2007/0047415 A1 | 3/2007 | Chang |
| 2007/0050593 A1 | 3/2007 | Chen et al. |
| 2007/0174582 A1 | 7/2007 | Feldman |
| 2008/0002272 A1 | 1/2008 | Riedel |
| 2008/0239901 A1 | 10/2008 | Tsunokawa et al. |
| 2008/0316639 A1 | 12/2008 | Tang et al. |
| 2009/0244775 A1 | 10/2009 | Ehrlich |
| 2009/0251821 A1 | 10/2009 | Song et al. |
| 2010/0014183 A1 | 1/2010 | Aoki et al. |
| 2010/0027406 A1 | 2/2010 | Krause et al. |
| 2010/0271727 A1 | 10/2010 | Namkoong et al. |
| 2010/0321817 A1 | 12/2010 | Aida et al. |
| 2012/0014013 A1 | 1/2012 | Bandic et al. |
| 2012/0194946 A1 | 8/2012 | Watanabe et al. |
| 2013/0148225 A1 | 6/2013 | Coker et al. |
| 2013/0155826 A1 | 6/2013 | Zhang et al. |
| 2013/0294207 A1 | 11/2013 | Erden et al. |
| 2014/0016224 A1 | 1/2014 | Unoki et al. |
| 2014/0043708 A1 | 2/2014 | Erden et al. |
| 2014/0055881 A1 | 2/2014 | Zaharris |
| 2014/0153134 A1 | 6/2014 | Han et al. |
| 2014/0160589 A1 | 6/2014 | Deki et al. |
| 2014/0285923 A1 | 9/2014 | Aoki et al. |
| 2014/0327983 A1 | 11/2014 | Biskeborn et al. |
| 2015/0178161 A1 | 6/2015 | Burd et al. |
| 2016/0148630 A1 | 5/2016 | Rausch |
| 2016/0148635 A1 | 5/2016 | Zhu et al. |
| 2016/0148636 A1 | 5/2016 | Ma et al. |
| 2016/0148637 A1 | 5/2016 | Rausch et al. |
| 2016/0148642 A1 | 5/2016 | Gao |
| 2016/0148643 A1 | 5/2016 | Gao et al. |
| 2016/0148644 A1 | 5/2016 | Zhu et al. |
| 2016/0148645 A1 | 5/2016 | Zhu et al. |

FOREIGN PATENT DOCUMENTS

| | | |
|---|---|---|
| JP | H02-240862 A2 | 9/1990 |
| WO | 2005-030869 A1 | 4/2005 |

* cited by examiner

WRITE MANAGEMENT OF PHYSICALLY COUPLED STORAGE AREAS

PRIORITY CLAIM

The present application claims priority to U.S. Patent Application Ser. No. 62/637,234 filed Mar. 1, 2018 and titled "Write Management of Physically Coupled Storage Areas", which is hereby incorporated by reference in its entirety.

BACKGROUND

Interlaced magnetic recording (IMR) is a storage technique that utilizes different track widths, sometimes with different linear densities, when writing alternating data tracks on a storage medium. For example, every-other track is written to have a wide track width, and the alternating, interlaced tracks are written with a comparably narrower width. In IMR systems, the tracks are spaced such that each one of the narrow (top) tracks overlaps and overwrites a small portion of the edges of the immediately adjacent wider (bottom) tracks. In some systems, write access rules prohibit data from being written to a narrow IMR track until data is first stored on the two contiguous (physically adjacent) wider IMR tracks. For this reason, the narrow data tracks in IMR are often referred to as "top tracks" while the wider data tracks are referred to as "bottom tracks."

In some implementations, IMR devices utilize a higher bit density when writing the wider (bottom) data tracks than the narrower (top) data tracks. As a result of this variable bit density, the variable track width, and the overlap between edges of adjacent tracks, a higher total areal density can be realized in IMR systems than that attainable in systems that implement the same magnetic recording type without utilizing alternating tracks of variable width and linear density.

BRIEF DESCRIPTIONS OF THE DRAWINGS

SUMMARY

Implementations disclosed herein provide a method that includes transmitting read/write characteristics of a logical block address space, the read/write characteristics including coupling information characterizing a physical arrangement of data blocks associated with different logical zones in the logical block address space. Each of the logical zones spans a continuous range of logical block addresses mapped to a series of data blocks physically interlaced with another series of data blocks corresponding to another one of the logical zones. The method further provides for executing a write command instructing a data write to a target logical zone of the logical zones, the write command being generated based on the transmitted coupling information.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

DETAILED DESCRIPTION

In some interlaced magnetic recording (IMR) systems, different linear densities are used when encoding data on different sets of data tracks. For example, even-numbered data tracks may store data at one linear density while odd-numbered data tracks store data at another linear density. As a consequence of this, different data tracks may be associated with different read/write throughput, even when those data tracks are adjacent to one another or within a same radial recording region (e.g., a recording region that is near the inner diameter or outer diameter of a disk).

In addition to being accessible with different read/write throughput rates, different IMR data tracks are accessible with different amounts of processing overhead, as explained further in the following description. Due to IMR track-to-track overlaps, updates to some data tracks may entail reading and re-writing data on adjacent tracks while other data tracks can be updated without such reading and re-writing of adjacent data tracks.

According to one implementation, the disclosed technology facilitates the transmission of read/write characteristics, such as characteristics indicative of write throughput, processing overhead, and/or fill state, to an external host computing system. Using such information, the external host computing system is able to make informed data direction decisions that leverage differences in read/write characteristics of different physical storage locations to improve system performance. For example, the external host computing system can direct frequently-accessed data to locations with high throughput and/or locations that can be accessed with low processing overhead.

Figure 1:
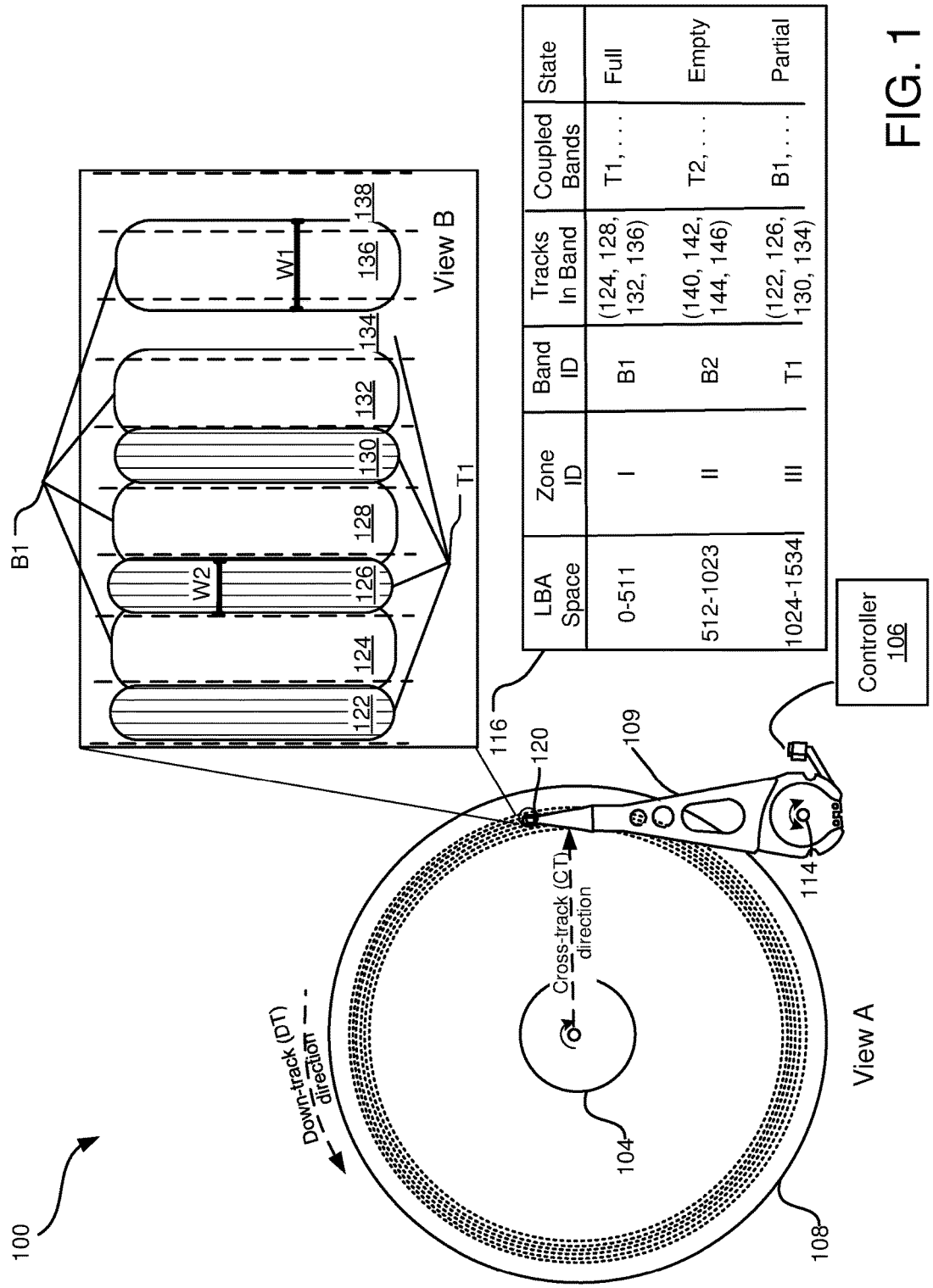
FIG. 1 illustrates a data storage device that implements an interlaced magnetic recording (IMR) band-management architecture that facilitates host-informed data storage location selection.

FIG. 1 illustrates a data storage device 100 that implements an interlaced magnetic recording (IMR) band-management architecture that facilitates host-informed data storage location selection. The data storage device 100 includes a transducer head assembly 120 for writing data on a magnetic storage medium 108. Although other implementations are contemplated, the magnetic storage medium 108 is, in FIG. 1, a magnetic storage disc on which data bits can be recorded using a magnetic write pole and from which data bits can be read using a magnetoresistive element (not shown). As illustrated in View A, the magnetic storage medium 108 rotates about a spindle center or a disc axis of rotation 112 during rotation, and includes an inner diameter 104 and an outer diameter 102 between which are a number of concentric data tracks. Information may be written to and read from data bit locations in the data tracks on the magnetic storage medium 108.

The transducer head assembly 120 is mounted on an actuator arm 109 at an end distal to an actuator axis of rotation 114. The transducer head assembly 120 flies in close proximity above the surface of the magnetic storage medium 108 during disc rotation, and the actuator arm 109 rotates during a seek operation about the actuator axis of rotation 112 to position the transducer head assembly 120 over a target data track for each read and write operation of the data storage device 100. The transducer head assembly 120 includes at least one write element (not shown) including a write pole for converting an electrical signal sent from a controller 106 into a magnetic signal of commensurate length. The magnetic pulses of the write pole selectively magnetize magnetic grains of the rotating magnetic media 108 as they pass below the pulsating write element.

View B of FIG. 1 illustrates a magnified view of a grouping of adjacent data tracks on the magnetic storage medium 108 recorded according to an IMR scheme. The IMR scheme includes alternating data tracks of different written track widths arranged with slightly overlapping written track boundaries so that a center-to-center distance between directly adjacent tracks (e.g., the track pitch) is approximately uniform across the surface of the magnetic storage medium 108. In the illustrated example, the IMR scheme includes alternating data tracks of two different written track widths. A first series of alternating tracks (e.g., the tracks 124, 128, 132, 136) have a wider written track width (W1) than a second series of interlaced data tracks (e.g., 122, 126, 130, which are shown as having a track width W2). In FIG. 1, the data tracks 134 and 138 represent IMR top tracks that do not yet store user data.

In View B, each of the wide data track of the first series of alternating tracks is written before the narrow and directly adjacent data tracks of the second series of alternating tracks. For example, the data track 124 is written before data is written to either of the data tracks 122 and 126. Data writes to the data tracks 122 and 126 overwrite outer edge portions of the data track 124; however, the data track 124 is still readable due to sufficient information retained in a center region of the data track.

Because each data track of wide written track width is written prior to directly adjacent data tracks of narrower written track width, the data tracks of the wider written track width (e.g., data tracks 124, 128, 132, and 136) are also referred to herein as "IMR bottom tracks," while the alternating data tracks of narrower written width (e.g., the data tracks 122, 126, 130) are referred to herein as "IMR top tracks." In one implementation, the IMR bottom tracks store data at a higher linear density than the IMR top tracks. As a result, data can be read from and written to the IMR bottom data tracks at a higher throughput rate.

Updating data on an IMR bottom track can entail excess processing overhead if data is already stored on one or more of the directly adjacent IMR top tracks. For example, an update to the data stored in the data track 128 entails reading the adjacent IMR top tracks 126 and 130 into memory, updating the data track 128, and then re-writing the adjacent data tracks 126 and 130 from memory. In contrast, an update to data on the IMR bottom track 136 can be performed without reading and re-writing any adjacent tracks because the adjacent data tracks 134 and 136 do not yet store any user data.

Variability in written track width, such as that illustrated in View B, can be accomplished differently in different types of recording systems. In systems utilizing energy-assisted magnetic recording (e.g., heat-assisted magnetic recording (HAMR) device or microwave-assisted magnetic recording (MAMR)), a written track width can be altered by changing operating power of the energy source (e.g., increased to increase written track width and decreased to decrease written track width). In other recording systems, variability in written track width can be achieved by utilizing different write elements and/or by altering write current parameters.

In FIG. 1, the illustrated IMR bottom tracks (the data tracks 124, 128, 132, and 136) form a single, complete IMR data band "B1.". The illustrated IMR top tracks (e.g., the data tracks 122, 126, 130, 134, and 138) form another data band "T1." In different implementations, the different IMR data bands may assume different numbers of tracks or different numbers of logical blocks. Within a single system, the data bands may be uniform or non-uniform in size. Some data bands may include integer number of tracks and other data bands may include a non-integer number of tracks. In at least one implementation, each IMR data band is equal in logical capacity (e.g., mapped across a same number of logical blocks).

Different data bands may be physically coupled to one another. As used herein, two data bands are said to be coupled when they include an arrangement of data blocks that are overlapping or physically interlaced. For example, a first data band is coupled to a second data band when the first data band includes at least one data block interlaced between data blocks of the second data band, such as when one band includes a data track that is interlaced between data tracks mapped to another data band.

Within the above-described IMR band management scheme, different IMR data bands may be understood as being physically coupled to one another. For example, the above-described data band B1 (including data tracks 124, 128, 132, and 136) is physically coupled to the data band T1 (including the data tracks 122, 126, 139, and 134). In one implementation, data is not written to the data band T1 until after the coupled band (B1) is filled with data. Various rules for filling each data band (e.g., and transitioning the data band through different fill states) are described below in greater detail with respect to FIGS. 5 and 6.

Each different IMR band may be understood as corresponding to an associated logical zone. In general, the term "logical zone" is used herein to refer to a continuous, consecutive range of logical block addresses (LBAs). In FIG. 1, the data tracks of IMR data band B1 (e.g., the data tracks 124, 128, 132 and 136) are consecutively mapped to a continuous subset of LBAs forming a first logical zone. Likewise the data tracks of IMR band T1 (e.g., the data tracks 122, 126, 130, and 136) are consecutively mapped to a different continuous subset of LBAs forming a separate logical zone. Like data bands, logical zones may also be understood as being physically coupled to one another (e.g., the first logical zone is coupled to the second logical zone).

A controller 106 of the data storage device 100 implements an LBA to physical block address (PBA) mapping and also keeps tracks of certain read/write characteristics associated with different ranges of the logical block address space utilized by an external host computing system when reading and writing data to the magnetic storage medium 108. In one implementation, the controller 106 tracks certain read/write characteristics of different logical zones. Although each logical zone spans a continuous, consecutive subset of LBAs, these LBAs are not mapped to a contiguous range of data tracks (data tracks that are touching or directly adjacent). Rather, each logical zone is mapped across a series of alternating data tracks. Stated differently, a logical zone consists of a grouping of consecutive IMR bottom tracks or, alternatively, a grouping of consecutive adjacent IMR top tracks. The physical tracks within a same logical zone are collectively referred to herein as a data band.

In FIG. 1, a table 116 illustrates exemplary read/write characteristics that the controller 106 tracks in relation to host logical block address space. In various implementations, the controller 106 provides some or all of this tracked information to an external host upon request. The table 116 includes different subsets of continuous, consecutive LBAs (logical zones) that are associated with different data bands. Each logical zone is further associated with a zone ID, which is generally usable to describe the corresponding grouping of physical tracks for the logical zone's contiguous LBAs. For example, a first logical zone (zone I) includes LBAs 0-511 that are mapped to the physical tracks of data band "B1" of IMR bottom tracks (e.g., including the data tracks 124, 126, 128, 132, 136 shown in View B). Likewise, a second logical zone (zone II) includes LBAs 512-1023 that are mapped to another group of physical tracks of data band "B2," which also includes IMR bottom tracks 140, 142, 144, and 146 (not shown in View B). A third logical zone (zone III) shown in the table 116 includes LBAs 512-1534 that are mapped to the physical tracks of data band "T1" including the series of IMR top tracks shown in View B (e.g., the data tracks 124, 126, 130, and 134.

The read/write characteristics tracked by the controller 106 may further include a data throughput indicator in association with each logical zone. In one implementation, linear density (e.g., spacing of data bits in the down-track direction) is higher on the IMR bottom data tracks than the IMR top data tracks. In such implementations, data throughput is therefore higher for the IMR bottom data tracks than the IMR top data tracks within same radial regions of the magnetic storage medium 108.

In the illustrated table 116, the data throughput indicator is included within the band ID in the form of a letter (B or T), which identifies whether the data band includes IMR bottom tracks and has a higher throughput (e.g., denoted with the letter B as in B1, B2 . . . ) or IMR top tracks with a lower throughput (e.g., denoted with the letter T as in T1, T2, . . . ). In other implementations, data throughput may be characterized in a variety of different ways, such as with an index numerically quantifying the relative throughput of the band or by some other data throughput indicator. Notably, data throughput may be affected by physical radial position in addition to linear density. For example, the number of data bits passing under the transducer head assembly 120 during each revolution of the disk is greater at the outer diameter 110 than at the inner dimeter 104. As a result of this, in systems with constant rotational rate, data throughput is greater at the outer diameter 110 than at the inner diameter 104 in systems with constant linear density at all track positions. To accurately characterize data throughput of each data band, the controller 106 may, in some implementations, utilize data throughput indicators that account for localized linear density and radial position—either separately for read throughput and write throughput, or in terms of joint total throughput.

In addition to a data throughput indicator (included in the band ID in FIG. 1), the controller 106 tracks coupling information as shown by the column labeled "Coupled Bands" shown in the table 116. For each data band, the coupling information indicates other data bands to which that data band is physically coupled. For example, T1 (a band of IMR top tracks) is coupled to (includes tracks overlapping or interlaced with) B1 (a band of IMR bottom tracks).

If the coupling information between either the physical bands (e.g., B1, T1) or the logical bands (e.g., zone I, zone III) is known to an external host, the external host can make informed inferences about the relationships between different physical storage areas and/or logical zones on the storage media 108. For example, if the host is aware that zone T1 is coupled to B1, the host may elect to send data to fill B1 before filling T1, as this results in decreased processing overhead as compared to the scenario where T1 is filled before B 1. Alternatively, the host may select storage locations based on characteristics of the data to be stored, such as by directing frequently accessed data to regions that can be accessed with lower processing overhead and/or highest data throughput. As hosts do not typically use physical addresses, it may be appreciated that the logic described above can similarly be implemented as a result of host understanding of the couplings between logical zones (e.g., zone I and zone III). If, for example, the host is aware that zone I is coupled to zone III, the host may elect to send data to fill zone before filling zone III.

In addition to the coupling information and data throughput indicator (e.g., the band ID), the table 116 is also shown to include a fill state that is tracked in association with each data band. The various fill states utilized may vary from one implementation to another. In the illustrated implementation, the fill states include "empty" (e.g., meaning devoid of user data), "partial" (e.g., meaning partially containing user data); or "full" (e.g., meaning the data band cannot receive more data without re-writing old user data). These are merely exemplary fill states. In some implementations, the controller 106 may track additional fill states such as "offline" (e.g., meaning the band does not store data and is unable to store data until selectively transitioned to a different fill state) or "read-only" (e.g., meaning the band is not permitted to receive additional data or be unless transitioned to a different fill state). A more in-depth discussion of these potential fill states is included with respect to FIGS. 5 and 6, below. Collectively, the information shown in the table 116 comprises "read/write characteristic" information that may be provided—in full or in part—to a host upon request.

According to one implementation, the controller 106 transmits device characteristics including read/write characteristic information—such as data band identifiers, band coupling information, and band data throughput indicators—to a host responsive to a host-initiated request for such information. According to another implementation, the controller 106 transmits device characteristics including read/write characteristic information—such as zone identifiers and associated LBA mapping information, zone coupling information, and zone data throughput indicators—to a host responsive to a host-initiated request for such information. The host utilizes such information to make informed data storage location selection decisions and generates one or more read/write requests based on such information. Upon receive of each read/write request from a host, the controller 106 determines applicable prioritized write access rules for execution of the read/write request and implements the request in accordance with those rules. Additionally, the controller 106 updates fill state information, as applicable, responsive to or concurrent with execution of host-initiated read/write requests.

Figure 2:
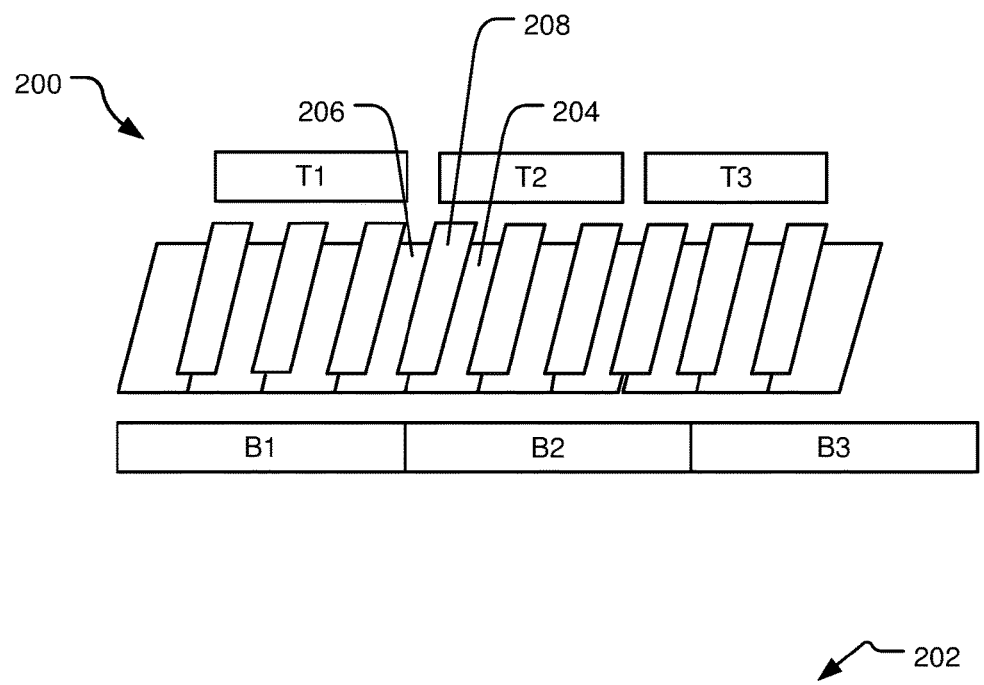
FIG. 2 illustrates example data bands and data band coupling information that may be stored by a storage device controller implementing an IMR band-management architecture that facilitates host-informed data storage location selection.

FIG. 2 illustrates example data bands 200 and data band coupling information 202 that may be stored by a storage device controller implementing an IMR band-management architecture that facilitates host-informed data storage location selection. In the illustrated example, six data bands are shown—B1, B2, B3, T1, T2, and T3. Each one of these data bands includes a consecutive grouping of IMR data tracks of a same track width and linear density. The tracks in each individual data band do not interlace with one another but do interlace with tracks in at least one other data band. The data bands T1, T2, and T3 each include a consecutive grouping of IMR top tracks, while the data bands B1, B2, and B3 each include a consecutive grouping of IMR bottom tracks. The IMR bottom data tracks have a wider track width and may have different linear density (e.g., higher read/write throughput) than the IMR top data tracks. In one implementation, each data band is mapped to a continuous, consecutive range of LBAs (a logical zone).

The storage device controller maintains a mapping of LBAs to each of the data bands and also stores the data band coupling information 202 in association with each data band. The example of FIG. 2 illustrates a scenario where each data band is coupled to up to two other data bands. For example, the data band B2 of IMR bottom tracks is coupled to both of the data bands T1 and T2, where the coupling with T2 occurs due to the overlap between data tracks 206 and 208. When a data band of IMR top tracks includes fewer tracks than an adjacent/coupled data band of IMR bottom tracks, the coupling is a one-to-one coupling. For example, the data band T1 is coupled exclusively to the data band B1.

In one implementation, the storage device controller provides the zone coupling information 202 to a host device. The host device, in turn, makes informed selections of LBA ranges for data storage based on the read/write characteristics of each data zone such as data throughput, the couplings between the various zones, and the fill states of the various zones.

In one implementation where the IMR bottom data tracks are written with higher linear density than the IMR top data tracks, the host device may logically forgo filling each band of IMR top tracks (e.g., T1, T2, or T3) until the associated coupled band(s) of IMR bottom tracks (B1, B2, B3) are first filled with data. For example, B1 may be filled with data before any data is written to either of the data bands T1 or T2. Likewise, B2 may be filled with data before any data is written to the data bands T2 or T3.

Although the data band of IMR bottom tracks may offer higher read/write throughput, the host device may, in some instances, elect to direct a data write to a data band of IMR top data tracks even if higher throughput data band is available elsewhere on the storage medium. Despite having lower linear density (and therefore, lower throughput at most storage locations except potentially the outer diameter), the data bands of IMR top data tracks may be accessible with lower processing overhead, making them well-suited for storage of data that is frequently updated (also referred to herein as "hot data"). For example, the host device may determine that data to be written spans a frequently-accessed LBA space and elect to store the data on a band of IMR top data tracks (e.g., T1, T2, or T3), which can be updated at random without affecting (e.g., without necessitating a read and re-write of) the interlaced bottom (e.g., immediately adjacent) data tracks.

Figure 3:
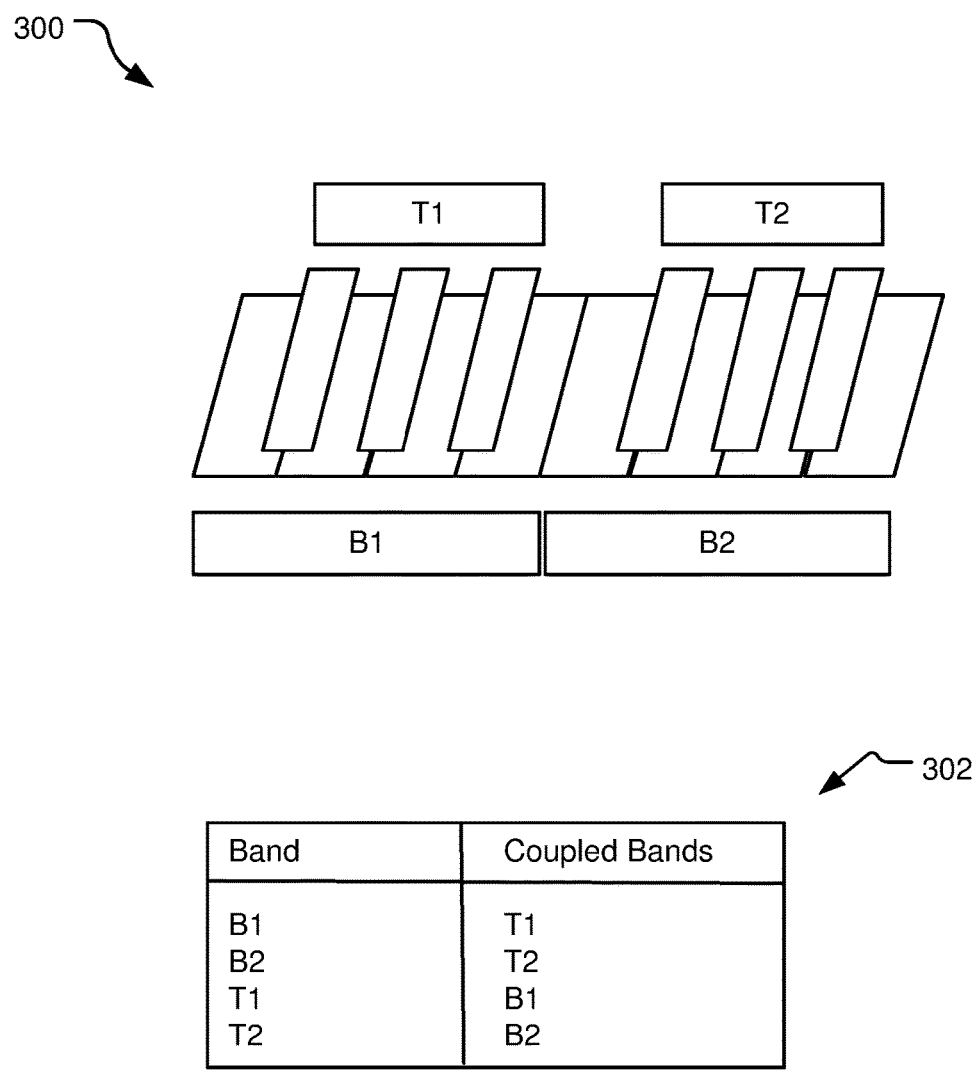
FIG. 3 illustrates example data bands and data band coupling information tracked by a storage device controller in another IMR band-management architecture that facilitates host-informed data storage location selection.

FIG. 3 illustrates example data bands 300 and data band coupling information 302 tracked by a storage device controller in another IMR band-management architecture that facilitates host-informed data storage location selection. In the illustrated example, six data bands are shown—B1, B2, B3, T1, T2, and T3—in a one-to-one coupling arrangement where each data band is be coupled to a single other data band. For example, the data band B1 of IMR bottom tracks is coupled to a data band T1 of IMR top tracks, while the data band B2 of IMR bottom tracks is coupled to a data band T2 of IMR top data tracks.

Like the data bands of FIG. 2, each one of the data bands shown in FIG. 3 includes a consecutive grouping of IMR data tracks of a same track width and linear density. The data bands T1, T2, and T3 each include a consecutive grouping of IMR top tracks, while the data bands B1, B2, and B3 each include a grouping of IMR bottom tracks. The IMR bottom data tracks have a wider track width and higher linear density (e.g., higher read/write throughput) than the IMR top data tracks. A storage device controller maintains a mapping of LBAs to each of the data bands and also stores the data band coupling information 302 in association with each data band.

The illustrated coupling architecture is simplified in contrast to the coupling architecture shown in FIG. 2 in that there exist fewer total couplings and, as a result, simplified implementation of various prioritized write access rules. For example, a prioritized access rule may provide that T1 can be filled with data at any time after B1 is filled with data. Likewise, T2 may be filled with data at any time after B2 is filled with data. However, this simplified fill logic is achieved at the expense of less efficient data storage due to the fact that an IMR top data track is essentially removed at the boundary between each consecutive pair of IMR bottom track data bands (e.g., between B1 and B2) as compared to the implementation of FIG. 2.

Figure 4:
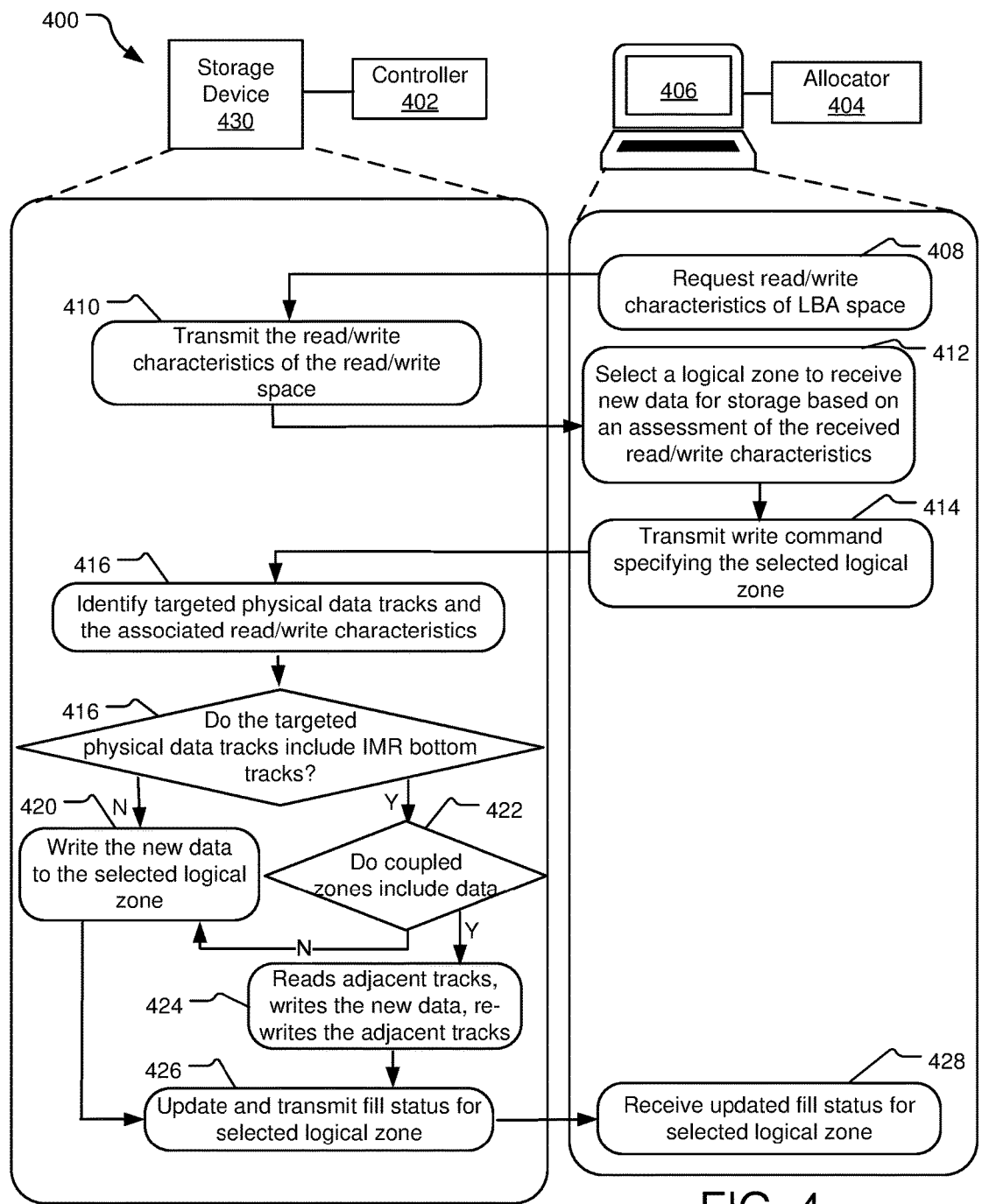
FIG. 4 illustrates a system that utilizes a controller-implemented IMR band-management architecture to facilitate host-informed data storage location selection.

FIG. 4 illustrates a system 400 that utilizes a controller-implemented IMR band-management architecture to facilitate host-informed data storage location selection. Specifically, FIG. 4 illustrates a flow of information between a storage device controller 402 (shown on the left side of the figure within a storage device 430) and a data allocator 404 (shown on the right sides of the figure within an external host 406). Both the storage device controller 402 and the data allocator 404 include software, or a combination of hardware and software, with the software in the form of instructions encoded on a tangible computer-readable storage medium. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by mobile device or computer. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. [[Note: the previously paragraph is largely boilerplate included to prevent a certain type of patent rejection]].

According to one implementation, the storage device controller 402 maintains a mapping of LBA space to physical data blocks in a magnetic disk and more specifically, a mapping of logical zones (e.g., ranges of consecutive LBAs) to defined data bands on the disk, where each data band consists of a consecutive grouping of IMR bottom tracks or a consecutive grouping of IMR top tracks. For each data band, the storage device controller 402 tracks various read/write characteristics information such as data band identifiers and associated LBA mapping information, band coupling information, data throughput indicators, and a fill state associated with each data band. As data is written to various data bands, the storage device controller dynamically updates fill state information, as discussed in greater detail below.

In the illustrated example, the data allocator 404 transmits a request 408 to the storage device controller 402 for the read/write characteristic information of the LBA space or a specific portion of the LBA space. For example, the request may be transmitted at the time the storage device is initialized by the external host 406, included within a data sheet pertaining to device characteristics, or otherwise conveyed.

The storage device controller 402 responds to this request (at 410) by transmitting some or all of the read/write characteristic information back to the data allocator 404. The transmitted read/write characteristics include at least a logical zone identifier (corresponding to an associated band of physical tracks) as well as coupling information for each logical zone. In some implementations, the storage device controller 402 additionally transmits data throughput indicators (e.g., indicators of read or write throughput) and/or fill state information for each logical zone.

At 412, the data allocator 404 assesses the received read/write characteristics and uses such information to select a logical zone to receive new data for storage based on an assessment of the received read/write characteristics. In different implementations, logical zone selection may be based on different criteria. In one implementation, the data allocator 404 makes the selection by assessing read/write characteristics of available storage areas in addition to assessing characteristics of the new data and/or various performance-based rules governing preferred storage conditions for the new data. In another implementation, the data allocator 404 determines which logical zones are generally available to receive data of a write operation and further identifies a subset of the available logical zones that embody preferred read/write characteristics. Preferred read/write characteristics may, for example, be determined based on a static set of rules or logic for determining preferred read/write characteristics with respect to each new write operation, such as rules based on an assessment of the type of data that is to be written to or read from the magnetic disk.

In one implementation, the data allocator 404 selects a logical zone for storing data based on assessment of the frequency with which the data is expected to be accessed (e.g., read or re-written). For example, the data allocator 404 receive and store a data throughput indicator in association with each logical zone. While high-throughput logical zones (e.g., zones corresponding to data bands of IMR bottom tracks may be preferred for data that is frequently read, data that is frequently updated (re-written) may be better suited for logical zones that are less processing-intensive to update (e.g., logical zones corresponding to data bands of IMR top tracks). This is because, for example, an update to a bottom IMR track may entail reading and re-writing data of adjacent data tracks if data is also stored on such adjacent tracks). Likewise, data that is not frequently updated ("cold data") may also be better suited for storage in a data band of IMR bottom tracks.

After selecting the logical zone to receive new data of the write operation, the data allocator 404 transmits read and write commands to the storage device. In the illustrated example, the data allocator 404 transmits a write command to the storage device controller 402 at 414. The write command specifies both the selected logical zone (e.g., the targeted LBA space) and includes the data to be written.

At 416, the storage device controller 402 receives the transmitted write command and identifies the physical data blocks in the selected logical zone as well as the read/write characteristics associated with the selected logical zone. At 418, the storage device controller 402 determines (at 422) whether the selected logical zone includes IMR bottom tracks. If the selected logical zone does not include IMR bottom tracks, the storage device controller 402 performs the write operation at 420 by writing the new data to the associated specified logical block addresses without reading or re-writing any adjacent track data. If, however, the storage device controller determines that the selected logical zone does include IMR bottom data tracks, the storage device controller 402 determines (at 422) whether any of the coupled data bands currently store valid user data. In one implementation, the storage device controller 402 determines whether the coupled zones include valid user data by checking a fill state for each of the coupled zone(s).

If none of the coupled zones contain data, the storage device controller 402 performs the write operation at 420 by writing the new data to the specified logical block addresses without reading or re-writing any adjacent track data. If, however, one or more of the coupled zones do contain data (e.g., as indicated by a coupled-zone fill state of "partial" or "full"), the storage device controller 402 performs the write operation according to a series of operations 424 whereby the storage device controller 402 identifies data tracks in the coupled band(s) that store data and also abut one or more data tracks that are to be updated by execution of the write command; reads data of these identified, data-storing adjacent data tracks into memory; writes the new data to the targeted LBA locations; and then re-writes the read data from memory to the associated locations in the adjacent data tracks.

At 426, the storage device controller 402 updates the fill state of the selected logical zone that received the new data, such as by moving the location of a write pointer or changing a fill state (e.g., from "empty" to "partial" or "full"). Updated fill state information may be communicated back to the data allocator 404 automatically or responsive to a next subsequent request for such information. At 428, the data allocator 404 receives the updated fill state information and updates host records accordingly.

Figure 5:
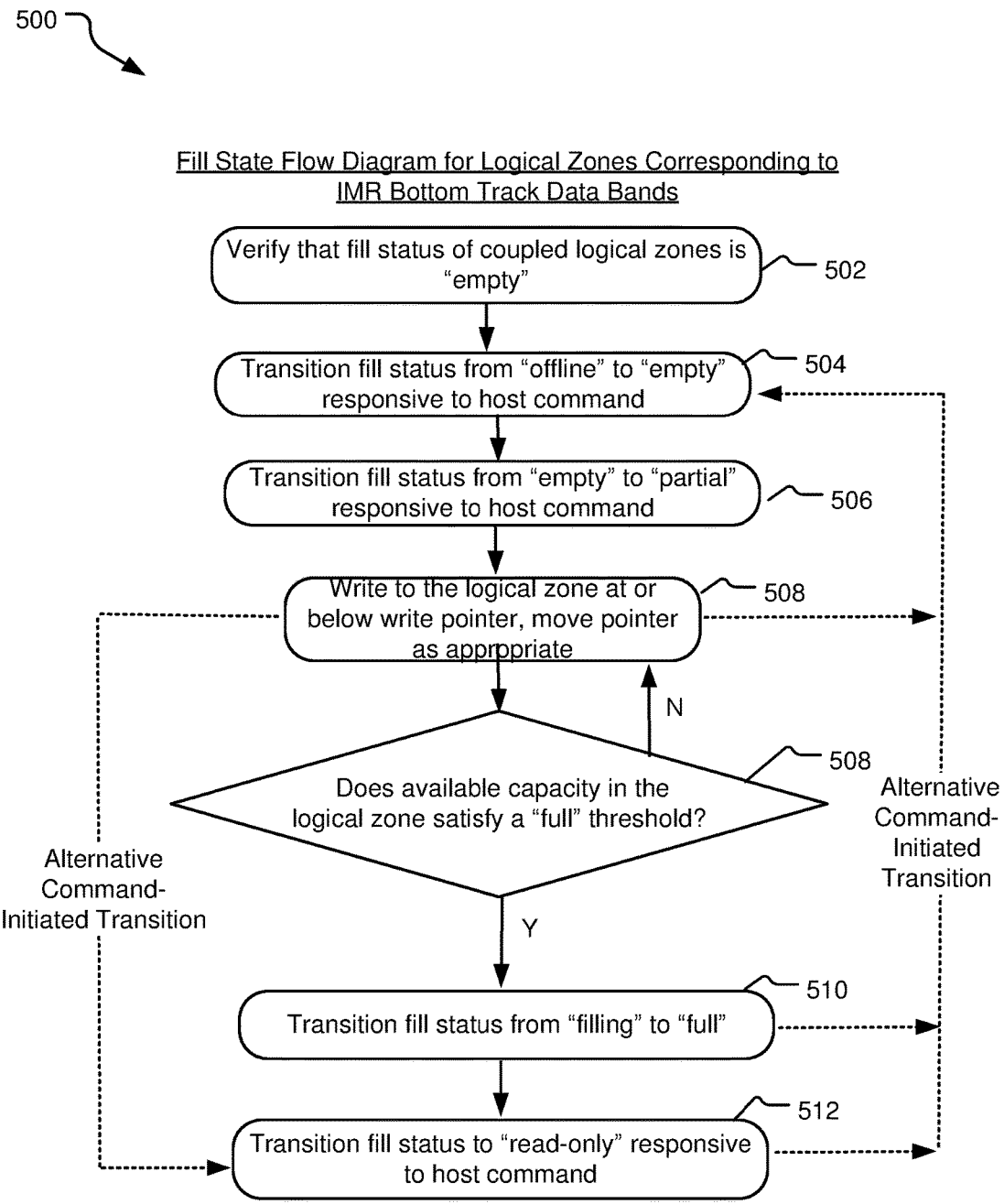
FIG. 5 illustrates a fill state flow diagram for a band of IMR bottom tracks in an IMR storage device.

FIG. 5 illustrates a fill state flow diagram 500 for a logical zone that corresponds to a band of IMR bottom data tracks (referred to below as "the IMR bottom track data band") in an IMR storage device. The IMR storage device implements a band-management architecture that facilitates host-informed selection of locations on a magnetic disk for data storage. Physical space on the magnetic disk is divided into data bands, and a storage device controller manages a mapping of each data band to a corresponding logical zone (e.g., continuous, consecutive subset of logical block addresses used by a host when reading data from and writing data to the magnetic disk). Each data band consists of a consecutive series of IMR bottom tracks or a consecutive series of IMR top tracks.

The storage device controller manages a fill scheme governing how the logical zones of the device are filled over time. To implement the fill scheme, the storage device controller tracks a fill state in association with each logical zone, updating these fill states as appropriate responsive to each write instruction received from a host device. In some implementations, fill state information is shared with the host device to allow the host to select storage locations for new data based on the fill scheme. The storage device may, at times, redirect data to ensure compliance with the fill scheme, such as if the storage device controller provides an instruction that is based on outdated fill state information.

Figure 6:
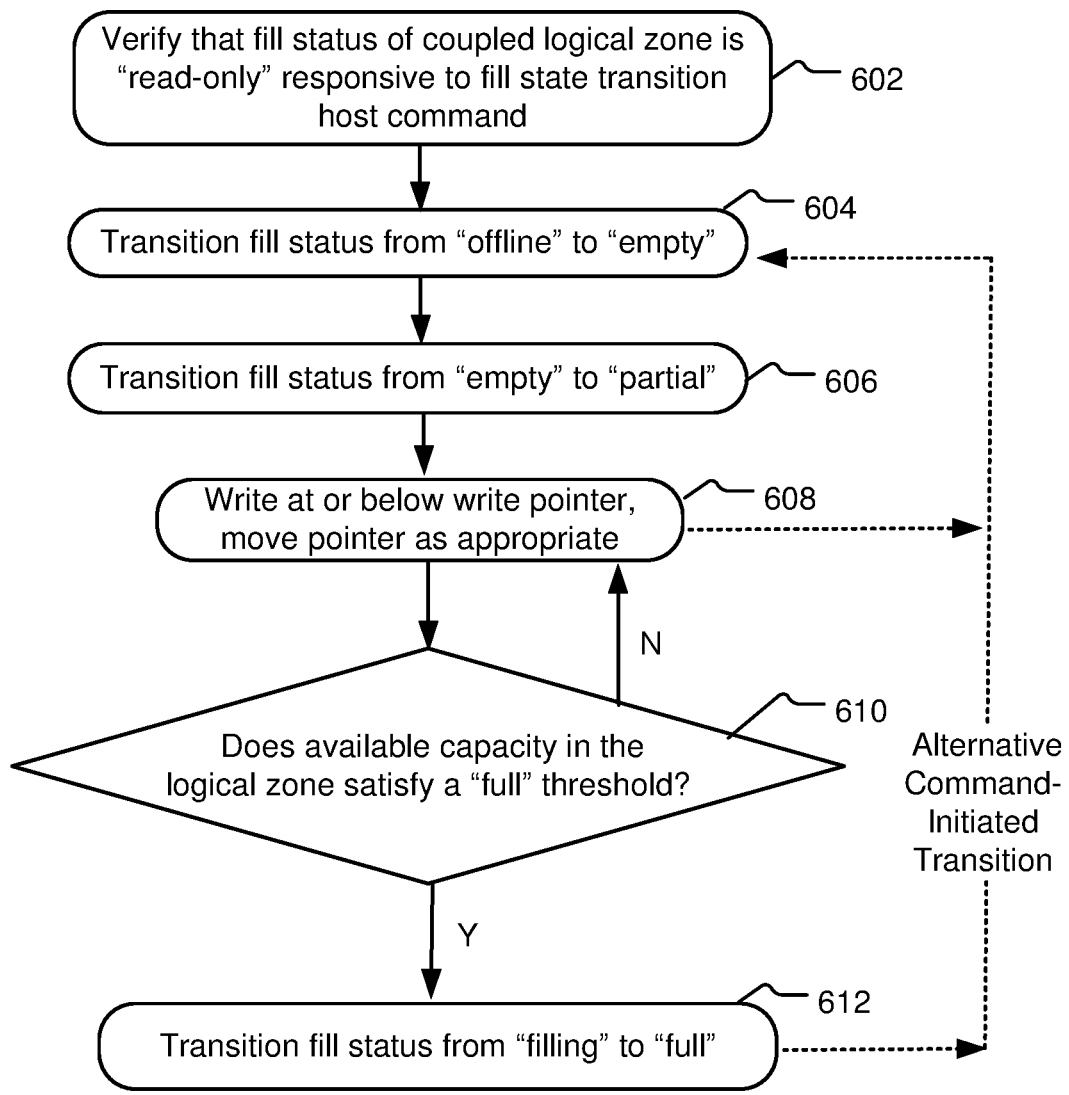
FIG. 6 illustrates a fill state flow diagram for a band of IMR top data tracks in an IMR storage device.

The fill state flow diagram 500 represents the various fill states and various logic for transitioning a logical zone between different fill states during the lifetime of the storage device. In this example, the logical zone filled by the operations in the fill state flow diagram is logical zone that is mapped, via an addressing scheme of the storage device controller, to a single IMR bottom track data band. It may be understood that similar logic may govern filling and fill state transitions for logical zones corresponding to other IMR bottom track data bands. In the same or another implementation, logical zones corresponding to IMR top track data bands are filled according to different logic discussed with respect to FIG. 6, below. The fill state flow diagrams of FIGS. 5 and 6 represent exemplary suitable but non-exclusive fill schemes for each logical zone of an IMR storage device. Other implementations of the technology may implement different fill schemes with fewer fill states or with one or more fill states in addition to or in lieu of those described above.

In FIG. 5, the logical zone has a fill state of "offline" when the storage device is manufactured and shipped for purchase. The offline fill state prohibits the storage device from writing data to the logical until a fill state transitioning command is received from a host device that requests a transitioning of the logical zone out of the offline fill state. Responsive to receipt of such a command, a verification operation 502 verifies that the fill status of any coupled logical zones is "empty." A transitioning operation 504 transitions the logical zone from the offline fill state to an empty fill state. The storage device controller updates the fill state that is stored in association with the logical zone and may, in some implementations, transmit a confirmation of the fill state update to a host.

Once the logical zone is in the empty state, the storage device controller is permitted to execute received read and write commands that target LBAs of the logical zone. A transitioning operation 506 transitions the logical zone from the empty fill state into a partial fill state. In one implementation, the transitioning operation 506 is performed responsive to receipt of a fill state transition command from the host device. In another implementation, the transitioning operation 506 is performed automatically by the storage device controller responsive to receipt of a first a write command directing data to an LBA sequence of the logical zone.

While the logical zone is in the filling fill state, various write operations 508 may be executed to progressively fill the logical zone according to a sequential fill order. Responsive to receipt of each host-initiated write command targeting LBAs of the logical zone, the storage device controller writes data at or below a current write pointer setting, moving the write pointer with each fill of previously-unused logical block(s) to ensure that the write pointer indicates a next unused logical block in the logical zone.

During a first write to the logical zone, data is written in the physically sequential fill order, beginning with the first available logical block (e.g., from an LBA 0 to an LBA 22). The storage device controller moves the write pointer to indicate a next available logical block in the logical zone (e.g., an LBA 23 in the previous example). The write operation 506 may continue directing data to fill the logical zone until the logical zone is full or some other capacity threshold is satisfied.

While the logical zone is in the filling fill state, write commands may also be executed to re-write (e.g., update) certain blocks before the write pointer. For these commands, the storage device controller may not update the write pointer.

After each of the write operations 506, a determination operation 508 determines whether available storage capacity in the logical zone satisfies a predetermined capacity threshold. In some implementation, the capacity threshold is not satisfied until data is stored in all logical blocks of the logical zone. In other implementations, the logical zone is treated as effectively full when available storage capacity in the logical zone decreases below some threshold, such as below 5%.

If the determination operation 508 determines that the available capacity in the logical zone does satisfy the capacity threshold, another transitioning operation 510 transitions a fill state of the logical zone into a "full" fill state. When the logical zone is in the full fill state, data can be written anywhere in the logical zone (e.g., updated or overwritten) without an associated movement of the write pointer. In one implementation, the storage device controller performs the determination operation 508 and autonomously updates the fill state to full when the capacity threshold is satisfied. In another implementation, an external host device performs the determination operation 508 and transmits a command that instructs the storage device controller to update the fill state to "full" when the capacity threshold is satisfied.

When the logical zone is in the full fill state, a command may be received instructing a transitioning of the logical zone into a "read-only" fill state. Responsive to such command from a host, a transitioning operation 512 transitions the logical zone into the read-only fill state. While the logical zone is in the read-only fill state, the storage device controller is prohibited from writing data to the logical zone even if a write command targeting the logical zone is received from the host.

In one implementation, the operations 502, 504, 506, 508, 510, and 512 represent a logically-performed transitioning sequence between the various fill states. In other implementations, however, a host device may, for various reasons, command the storage device to transition the logical zone fill state to "empty" or "read-only" at other points in time (e.g., while the zone is filling or full). These optional transitions are represented by dotted arrows in FIG. 5.

FIG. 6 illustrates a fill state flow diagram 600 for a logical zone corresponding to and data band of IMR top data tracks in an IMR storage device. In one implementation, the IMR storage device is the same IMR storage device implementing the fill state flow diagram 500 of FIG. 5 for each IMR bottom track data band. The fill state flow diagram 600 represents the various fill states and various logic for transitioning a logical zone corresponding to an IMR top track data band between different fill states during the lifetime of the storage device. It may be understood that similar logic may govern filling and fill state transitions for other logical zones corresponding to IMR top track data bands.

In FIG. 6, the logical zone has a fill state of "offline" when the storage device is manufactured and shipped for purchase. In the illustrated implementation, a storage device controller is prohibited from transitioning the fill state of the logical zone from "offline" to "empty" until after the fill state of any coupled logical zones are in a "read-only" fill state.

Responsive to a fill state transition command from a host, a verifying operation 602 verifies that the fill state of any coupled logical zones (e.g., logical zones corresponding to IMR bottom track data bands) is in the read-only fill state. If the logical zone is coupled with any logical zones that are not yet in the read-only fill state, the storage device controller may decline to implement the host-initiated fill state transition request. On the other hand, if the verification operation 602 successfully verifies that each coupled logical zone is already in the read-only fill state, the storage device controller executes a transitioning operation 604 to transition the logical zone from the offline fill state to the empty fill state. Prior to this transition, the storage device controller is prohibited from executing any received read or write commands targeting logical block locations that correspond to the logical zone.

During the transitioning operation 604, the storage device controller updates the fill state that is stored in association with the logical zone and may, in some implementations, transmit a confirmation of the fill state update to a host. Once the logical zone is in the empty fill state, the storage device controller is permitted to execute received read and write commands that target logical block locations within the logical zone.

Responsive to receipt of a fill state transition command or a first write command directing data to the logical zone, another transitioning operation 606 transitions the logical zone from the empty fill state into a partial state. In one implementation, the transitioning operation 606 is performed responsive to receipt of a fill state transition command from the host device. In another implementation, the transitioning operation 606 is performed automatically by the storage device controller responsive to receipt of a first a write command directing data to the logical zone.

While the logical zone is in the filling fill state, various write operations 608 may be executed to progressively write data to the logical zone according to a physically sequential fill order. Responsive to receipt of each host-initiated write command targeting the logical zone, the storage device controller writes data at or below a current write pointer setting, moving the write pointer with each fill of previously-unused data block(s) to ensure that the write pointer indicates a next unused logical block in the logical zone. The write operations 608 may continue to logically fill the logical zone until the zone is full or some other capacity threshold is satisfied.

While the logical zone is in the partial fill state, write commands may also be executed to re-write (e.g., update) certain blocks before the pointer. In these cases, the storage device controller may not update the write pointer.

After each one of the write operations 608, a determination operation 610 determines whether available storage capacity in the logical zone satisfies a predetermined capacity threshold. In some implementation, the capacity threshold is not satisfied until data is stored in all logical blocks of the logical zone. In other implementations, the logical zone is treated as effectively full when available storage capacity in the logical zone decreases below some predefined threshold.

If the determination operation 610 determines that the available capacity in the logical zone does satisfy the capacity threshold, another transitioning operation 612 transitions the fill state of the logical zone into a full fill state. When the logical zone is in the full fill state, data can be written anywhere in the logical zone (e.g., updated or overwritten) without an associated movement of the write pointer. In one implementation, the storage device controller autonomously updates the fill state to full when the capacity threshold is satisfied. In another implementation, an external host device performs the determination operation 610 and instructs the storage device controller to update the fill state to full when the capacity threshold is satisfied.

In one implementation, the operations 602, 604, 606, 608, 610, and 612 represent a logically-performed transitioning sequence between the various fill states for the logical zone. In other implementations, however, a host device may, for various reasons, command the storage device to transition the logical zone fill state to the empty fill state at various points in time (e.g., while the zone is filling or full). These optional transitions are represented by dotted arrows in FIG. 6.

The embodiments of the disclosed technology described herein are implemented as logical steps in one or more computer systems. The logical operations of the presently disclosed technology are implemented (1) as a sequence of processor-implemented steps executing in one or more computer systems and (2) as interconnected machine or circuit modules within one or more computer systems. The implementation is a matter of choice, dependent on the performance requirements of the computer system implementing the disclosed technology. Accordingly, the logical operations making up the embodiments of the disclosed technology described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A method comprising:
   transmitting read/write characteristics of a logical block address space, the read/write characteristics including coupling information characterizing a physical arrangement of data blocks associated with different logical zones in the logical block address space, each of the logical zones spanning a continuous range of logical block addresses and mapped to a series of data blocks that is physically coupled to another series of data blocks corresponding to another one of the logical zones; and
   executing a write command instructing a data write to a target logical zone of the logical zones, the write command generated based on the transmitted coupling information.

2. The method of claim 1, wherein the read/write characteristics include a data throughput indicator quantifying a write throughput associated with each one of the different logical zones.

3. The method of claim 1, further comprising:
   updating a fill state of the target logical zone; and
   transmitting the updated fill state of the target logical zone to a host responsive to a query for the read/write characteristics of the logical block address space.

4. The method of claim 1, wherein the logical block address space is distributed among data tracks managed according to an interlaced magnetic recording (IMR) scheme and the method further comprises:
   determining that the target logical zone corresponds to a data band consisting of bottom IMR data tracks;
   accessing coupling information stored in association with the data band to determine a fill state of one or more physically-coupled data bands; and
   selectively executing the write command according to a set of operations selected based on the determined fill state of the one or more physically-coupled data bands.

5. The method of claim 4, wherein the fill state indicates that user data is not stored in the one or more physically-coupled bands and the method further comprises:
  executing the write command without reading data of the one or more physically-coupled bands into memory.

6. The method of claim 4, wherein the fill state indicates that user data is stored in the one or more physically-coupled data bands and the method further comprises:
  identifying target data tracks of the data band to be updated by execution of the write command;
  identifying adjacent data tracks abutting the identified target data tracks;
  reading data of the identified adjacent data tracks into memory;
  updating the identified target data tracks with data specified by the write command; and
  re-writing the data of the identified adjacent data tracks from the memory.

7. The method of claim 1, wherein the logical block address space is distributed among data tracks managed according to an interlaced magnetic recording (IMR) scheme and the method further comprises:
  determining that the target logical zone corresponds to a data band consisting of top IMR data tracks;
  accessing coupling information stored in association with the data band to determine a fill state of one or more physically-coupled data bands; and
  failing the write command based on the determined fill state of the one or more physically-coupled data bands.

8. The method of claim 1, wherein the method further comprises:
  adjusting a write pointer responsive to execution of the write command;
  determining that a capacity condition is satisfied by data stored within the target logical zone; and
  responsive to the determination, updating a fill state associated with the target logical zone to a read-only state, the read-only state effective to prevent subsequent writes to the target logical zone.

9. The method of claim 1, wherein the method further comprises:
  receiving a fill state update command; and
  responsive to the fill state update command, updating a fill state associated with the target logical zone to a read-only state, the read-only state effective to prevent subsequent writes to the target logical zone.

10. A system comprising:
  a storage device controller stored in memory and executable by a processor to:
    transmit read/write characteristics of a logical block address space, the read/write characteristics including coupling information characterizing a physical arrangement of data blocks associated with different logical zones in the logical block address space, each of the logical zones spanning a continuous range of logical block addresses and mapped to a series of data blocks physically interlaced with another series of data blocks corresponding to another one of the logical zones; and
    execute a write command instructing a data write to a target logical zone of the logical zones, the write command generated based on the transmitted coupling information.

11. The system of claim 10, wherein the storage device controller is further executable to transmit a data throughput indicator within the read/write characteristics of the logical block address space, the data throughput indicator quantifying a write throughput associated with each one of the different logical zones.

12. The system of claim 10, wherein the storage device controller is further executable to update a fill state of the target logical zone; and
  transmit the updated fill state of the target logical zone to a host responsive to a query for the read/write characteristics of the logical block address space.

13. The system of claim 10, wherein the logical block address space is distributed among data tracks managed according to an interlaced magnetic recording (IMR) scheme and the storage device controller is further executable to:
  determine that the target logical zone corresponds to a data band consisting of bottom IMR data tracks;
  access coupling information stored in association with the data band to determine a fill state of one or more physically-coupled data bands; and
  selectively execute the write command according to a set of operations selected based on the determined fill state of the one or more physically-coupled data bands.

14. The system of claim 13, wherein the fill state indicates that user data is not stored in the one or more physically-coupled data bands and the storage device controller is further executable to:
  execute the write command without reading data of the one or more physically-coupled data bands into memory.

15. The system of claim 13, wherein the fill state indicates that user data is stored in the one or more physically-coupled data bands and the storage device controller is further executable to:
  identify target data tracks of the data band to be updated by execution of the write command;
  identify adjacent data tracks abutting the identified target data tracks;
  read data of the identified adjacent data tracks into memory;
  update the identified target data tracks with data specified by the write command;
  re-write the data of the identified adjacent data tracks from the memory.

16. The system of claim 10, wherein the logical block address space is distributed among data tracks managed according to an interlaced magnetic recording (IMR) scheme and the storage device controller is further executable to:
  determine that the target logical zone corresponds to a data band consisting of top IMR data tracks;
  access coupling information stored in association with the data band to determine a fill state of one or more physically-coupled data bands; and
  fail the write command based on the determined fill state of the one or more physically-coupled data bands.

17. The system of claim 10, wherein the storage device controller is further executable to:
  adjust a write pointer responsive to execution of the write command;
  determine that a capacity condition is satisfied by data stored within the target logical zone;
  responsive to the determination, update a fill state associated with the target logical zone to a read-only state, the read-only state effective to prevent subsequent writes to the target logical zone.

18. One or more computer-readable storage media encoding computer-executable instructions for executing on a computer system a computer process, the computer process comprising:

transmitting read/write characteristics of a logical block address space, the read/write characteristics including coupling information characterizing a physical arrangement of data blocks associated with different logical zones in the logical block address space, each of the logical zones spanning a continuous range of logical block addresses and mapped to a series of data blocks that is physically coupled to another series of data blocks corresponding to another one of the logical zones; and executing a write command instructing a data write to a target logical zone of the logical zones, the write command generated based on the transmitted coupling information.

19. The one or more computer-readable storage media of claim 18, wherein the read/write characteristics include a data throughput indicator quantifying a write throughput associated with each one of the different logical zones.

20. The one or more computer-readable storage media of claim 18, wherein the logical block address space is distributed among data tracks managed according to an interlaced magnetic recording (IMR) scheme and the computer process further comprises:

determining that the target logical zone corresponds to a data band consisting of bottom IMR data tracks;

accessing coupling information stored in association with the data band to determine a fill state of one or more physically-coupled data bands; and selectively executing the write command according to a set of operations selected based on the determined fill state of the one or more physically-coupled data bands.

\* \* \* \* \*